United States Patent [19]

Himmelein et al.

[11] Patent Number: 5,123,300
[45] Date of Patent: Jun. 23, 1992

[54] PHASING TRANSMISSION

[75] Inventors: Marvin K. Himmelein, Sylvania; James D. Haaser, Toledo, both of Ohio

[73] Assignee: Dynamics Research & Development Corp., Toledo, Ohio

[21] Appl. No.: 751,179

[22] Filed: Aug. 28, 1991

[51] Int. Cl.⁵ .................................. F16H 1/26
[52] U.S. Cl. ........................ 74/640; 74/395; 475/347
[58] Field of Search ........... 74/640, 346; 475/331, 475/343, 346, 347

[56] References Cited

U.S. PATENT DOCUMENTS

| | | | |
|---|---|---|---|
| 2,955,480 | 10/1960 | Gut | 74/395 |
| 3,017,784 | 1/1962 | Monaghan | 74/395 |
| 3,166,947 | 1/1965 | Hendershot | 474/137 |
| 3,364,789 | 1/1968 | Whitfield | 475/7 |
| 3,563,104 | 2/1971 | Schuster | 74/395 |
| 3,683,875 | 8/1972 | Chadwick | 123/90.15 |
| 4,286,476 | 9/1981 | Stiff | 74/640 |
| 4,289,046 | 9/1981 | Kontz | 475/2 |
| 4,294,218 | 10/1981 | King et al. | 123/502 |
| 4,382,391 | 5/1983 | Stiff | 74/640 |
| 4,561,795 | 12/1985 | Panuska | 74/395 |
| 4,566,352 | 1/1986 | Stiff | 74/640 |
| 4,566,353 | 1/1986 | Stiff | 74/640 X |
| 4,583,501 | 4/1986 | Williams | 123/90.15 |
| 4,747,375 | 5/1988 | Williams | 123/90.15 |
| 4,787,345 | 11/1988 | Thoma | 123/90.17 |
| 4,802,376 | 2/1989 | Stidworthy | 475/16 |
| 4,951,518 | 8/1990 | Hendershot | 74/640 X |

FOREIGN PATENT DOCUMENTS

| | | | |
|---|---|---|---|
| 60-184750 | 9/1985 | Japan | 74/640 |
| 63-53340 | 3/1988 | Japan | 74/640 |
| 1525367 | 11/1989 | U.S.S.R. | 74/640 |

OTHER PUBLICATIONS

Harmonic Drive, Power Transmission Products Brochure 1988.
Candy Controls Dynamic Differential 1990.
USM Corporation Designing Differential Transmissions Using the Harmonic Drive Principle.
Zahnrad-U. Getriebefabrik Siegfried F. Tandler Speed Correction Drives.
Candy Controls 1987.
Candy Controls Candy Positioner 1987.
Candy Controls Candy Timing Hub 1987.
Candy Controls Phase Variator 1986.

*Primary Examiner*—Richard Lorence
*Assistant Examiner*—William O. Trousdell
*Attorney, Agent, or Firm*—Emch, Schaffer, Schaub & Porcello Co.

[57] ABSTRACT

A compact phasing transmission having an infinitely variable adjustment to the relative phases between the input shaft and output shaft of the transmission is disclosed. A harmonic drive pancake gear set is incorporated between the input shaft and output shaft of the transmission. A pancake motor is enclosed within the phase transmission and is coupled to the harmonic drive pancake gear set to provide input to the wave generator of the harmonic drive. The intermeshing of the pancake motor and harmonic drive between the input shaft and output shaft of the phasing transmission will cause the two shafts to rotate at the same speed. When the pancake motor is activated, the wave generator of the harmonic drive gear set will rotate thereby varying the phases between the input shaft and output shaft of the phasing transmission.

3 Claims, 5 Drawing Sheets

PHASING TRANSMISSION

TECHNICAL FIELD

The present invention relates generally to the field of power transmission devices adapted to coordinate the relative rotations or phases of two or more rotating components.

BACKGROUND ART

The power transmission of this invention is a phase controller having an input shaft and an output shaft which is interposed between two rotating elements. The present invention provides the ability to continuously and dynamically adjust the relative phases between the input and output shafts without altering the relative speeds of the rotating components.

Phase controllers are commonly utilized in timing applications between two or more rotating machine components. For instance, phase controllers are used to advance or retard the timing of feeders, index heads, registration systems, marking and printing heads, glue and label applicators and timing screws. Phase controllers are also used to coordinate the timing of cut-off knives, feed rollers, conveyors, transfer mechanisms, packaging machine components, and die cutting and cut-off heads. Phase control is necessary any time the relative rotation of two or more elements must be regulated or coordinated with respect to each other.

For the purposes of this application, it should be noted that phase control does not attempt to alter the speed of rotation of the distinct rotating elements. Rather, phase control as used in this application, is intended to alter the angular position of distinct points on each of the rotating workpieces.

Commonly, phase controllers or phasing transmissions incorporate a gear cage rotatably mounted about the input shaft and output shaft of the transmission to control the relative phases of the two shafts. Such a phasing transmission is disclosed in U.S. Pat. No. 3,565,104 wherein a pair of opposed spider gears are engaged between the pinon gears and the input shaft and the output shaft of the transmission. The spider gears are carried by a ring gear which rotates about 360°, thereby moving the position of the spider gears with respect to the pinion gears to adjust or alter the relative phases of the input shaft and output shaft. The phase controller described in U.S. Pat. No. 3,565,104 uses a manual adjustment screw to impart rotation to the ring gear, thus varying the phases of the input shaft and the output shaft of the transmission. Rotation of the ring gear can also be achieved through the use of a motor control placed on the adjustment screw. Such motors are usually mounted in a location outside of the housing of the phase controller transmission.

Phase controllers such as the device disclosed in the U.S. Pat. No. 3,565,104 suffer from problems inherently found in most devices which utilize a series of intermeshed gears. Perhaps the most exasperating problem is the existence of backlash due to the engagement between the series of intermeshed gears and there is ongoing interest in providing a simple and low cost solution to the problems of backlash in phase controller transmissions.

Recently, somewhat improved backlash characteristics have resulted from the introduction of harmonic drive devices, utilizing strain wave gearing, into the structure of phasing transmissions. Phasing transmissions having a harmonic drive component have enhanced the ability to accurately control the relative phases of two rotating elements while reducing the potential for backlash when compared to phase control devices such as that shown in U.S. Pat. No. 3,565,104. Such harmonic drive devices generally consist of a pair of circular internal gears, the dynamic spline and the circular spline. The circular spline carries more teeth than the dynamic spline; in most common designs, two more teeth. A third member, the flex spline, is an external gear of an outside diameter slightly less than the inside diameter of the two internal gears and is designed to flex to engage the internal gear teeth of the dynamic spline and circular splines. Generally, the flex spline comprises a thin walled steel ring with the same number of external spline teeth as the dynamic spline. The flex spline is of a diameter, that when placed inside the dynamic spline and the circular spline, will not universally engage the gear teeth of the dynamic spline and circular spline about 360°. In fact, the flex spline will only engage the gear teeth of the circular and dynamic splines when pressed into an elliptical shape having a major axis and a minor axis. The gearing teeth will engage about the major axis and will not engage at all on the minor axis.

The dynamic input to such a harmonic drive device is usually provided by a wave generator which has an elliptical bearing and a rotating input element. The rotating elliptical shape of the wave generator imparts a rotating elliptical shape to the flex spline causing the exterior gearing of the flex spline to engage the interior gearing of the dynamic spline and the circular spline in a progressive nature about the axis of the harmonic drive device. As the flex spline progressively rotates about its engagement with the circular spline and dynamic spline the differential in teeth between the dynamic spline and the circular spline will establish a phase change between the dynamic spline and the circular spline equal to the tooth differential for every one revolution.

In most designs where a harmonic drive device is utilized with a phase controller transmission, it is positioned between the input shaft and output shaft of the transmission. Many times the input shaft of the transmission has a hollow core extending therethrough along its axis. Thus, a control motor placed on the exterior of the transmission is usually engaged, via a driveshaft inserted through the hollow core of the input shaft, with the wave generator of the harmonic drive device. The exterior mounted motor can then control the harmonic drive device thereby controlling the relative phases of the input shaft and output shaft of the phasing transmission.

It has been found that such a use of a harmonic drive unit incorporated into a phase controller transmission has succeeded in reducing the potential for backlash in the phase controller transmission to about 20 minutes or one-third of a degree. However, the physical arrangement of the drive components for this type of harmonic drive phasing transmission presents problems when the phasing transmission must be placed in areas having limited space availability. Further, for many applications, 20 minutes of backlash remains an unacceptably high amount of backlash and is therefore undesirable.

Therefore, it is an object of this invention to provide a phase control transmission having self-contained components for the purposes of meeting design and space constriction requirements.

Another object of this invention is to provide a phasing control transmission which is infinitely adjustable about 360° and can be accurately and consistently controlled.

Yet another object of the present invention is to provide a phasing control transmission having backlash potential approaching zero.

These objects are met by the improved phase controller transmission of the present invention. The present invention provides for an improved phase controller transmission which solves the problems of incorporating a harmonic drive member into the design of the phase controller transmission and facilitates the further reduction of backlash potential to practically zero.

DISCLOSURE OF INVENTION

The phase controller of the present invention provides for a compact phasing transmission which is infinitely variable when adjusting the relative phases between the input shaft and the output shaft of the transmission. A harmonic drive pancake motor and gear set is incorporated within the phase controller transmission. The dynamic spline of the harmonic drive pancake gear is fixed to the one shaft of the phase controller transmission. The circular spline of the gear set is fixed to a pancake motor which in turn is fixed to the other shaft of the phase controller transmission. A braking torque, preferably derived from the braking torque of the motor and the braking torque of a clutch device, is coupled with the engagement of the geared splines of the harmonic drive to enable the two shafts of the transmission to run in phase at the same speed during normal operations of the transmission. If it is desired to correct or alter the phase relationship between the input shaft and the output shaft, the pancake motor is activated to rotate the elliptical wave generator of the harmonic drive pancake gear thereby creating a phase change between the dynamic spline and circular spline of the harmonic drive pancake gearing. Since the dynamic spline and circular spline are each engaged with a different shaft, the phase change between the dynamic spline and circular spline will translate to a phase change between the input shaft and output shaft.

The invention will be more fully understood after reviewing the following description of the preferred embodiment of the invention with reference to the accompanying drawings.

BRIEF DESCRIPTION OF THE DRAWINGS

FIG. 5 is a schematic view of the harmonic drive unit showing the gear teeth intermeshed along the major axis.

FIG. 6 is a schematic view of the harmonic drive unit showing the major axis rotated 90° and the relative phases between the gear teeth beginning to shift.

BEST MODE OF CARRYING OUT INVENTION

Figure 1:
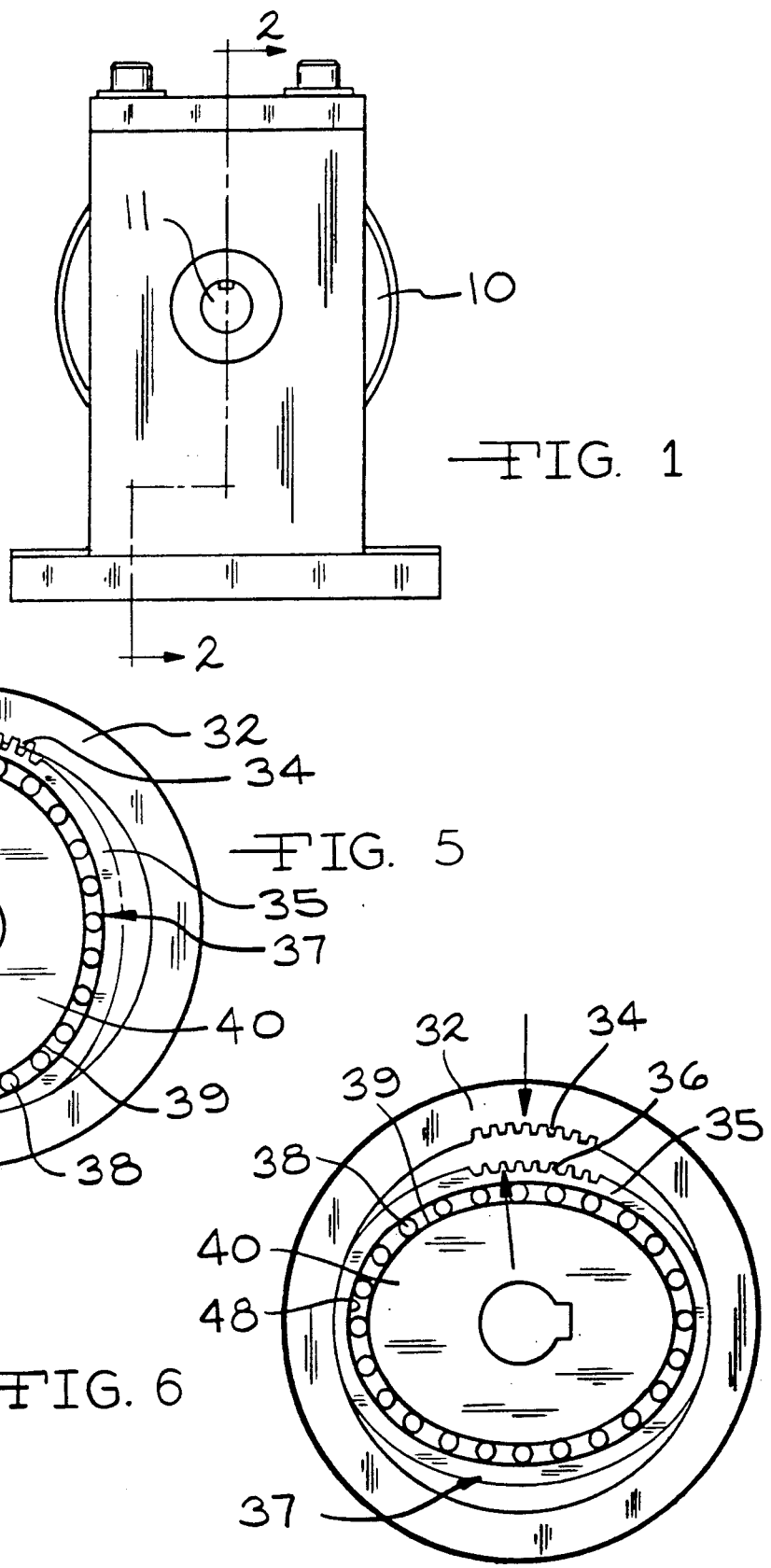
FIG. 1 is an end-on elevated view of the phasing transmission of the present invention.
Figure 2:
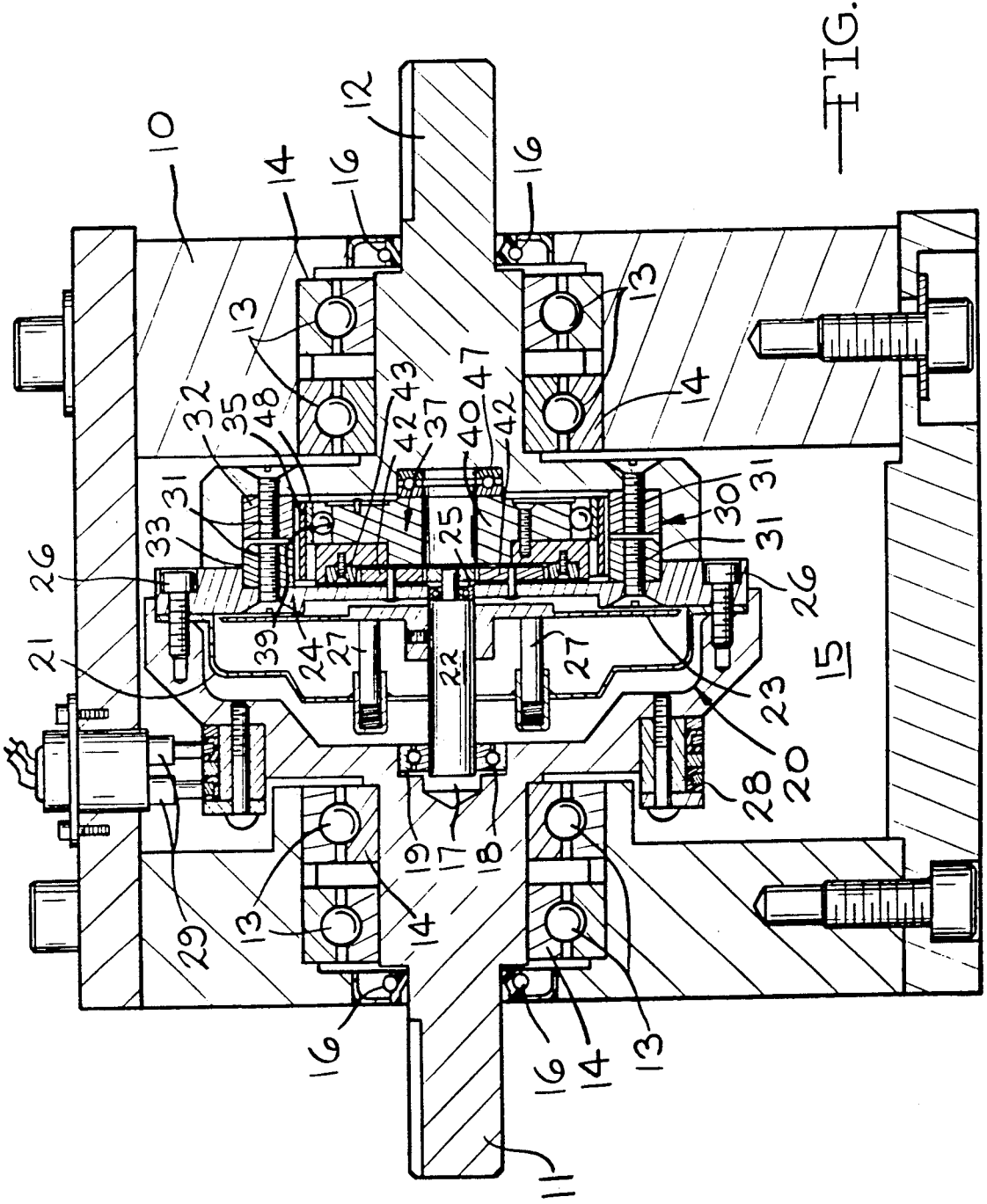
FIG. 2 is a sectional view of the phasing transmission of the present invention taken along line 2—2 of FIG. 1.
Figure 3:
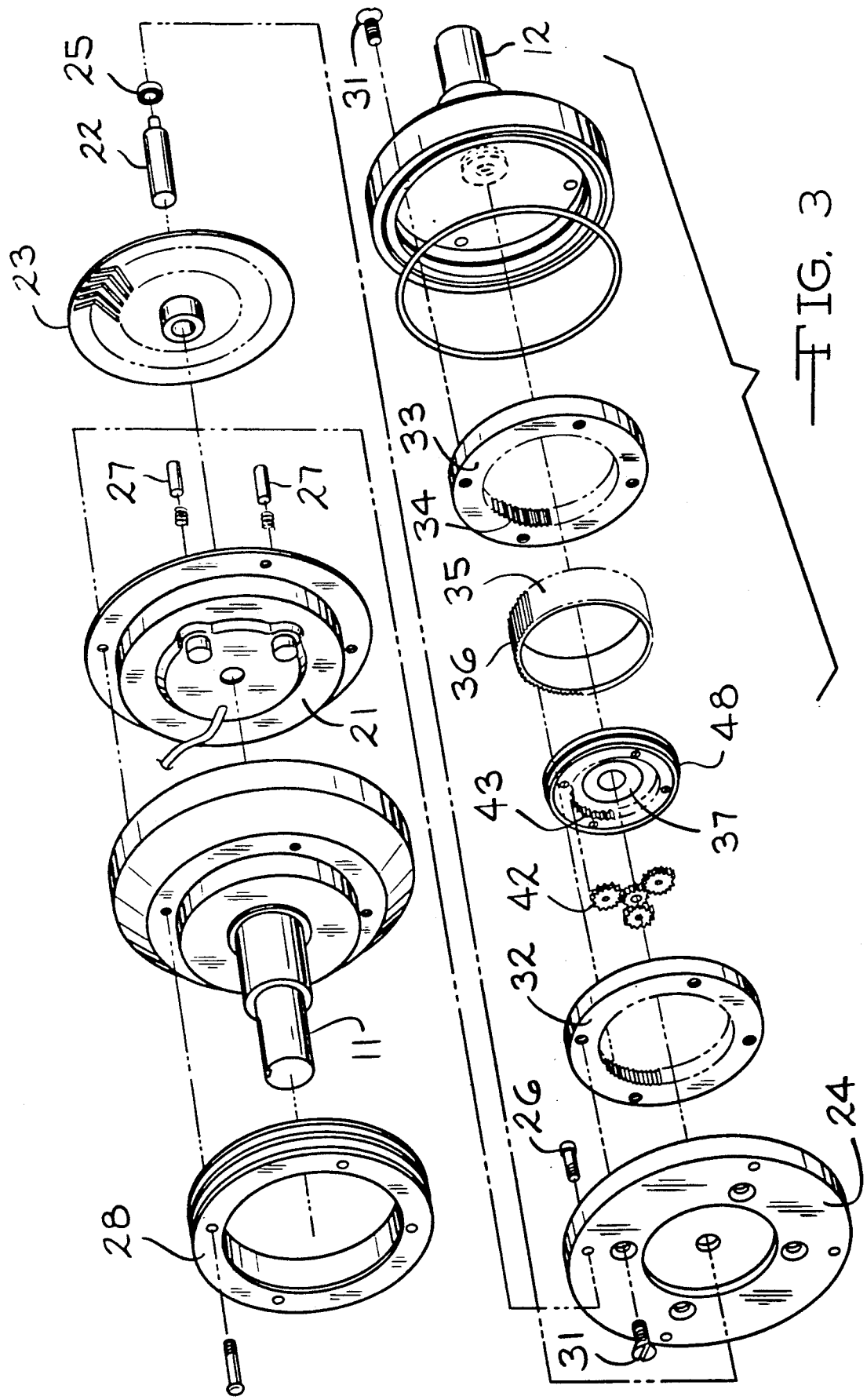
FIG. 3 is a blow-up view of the phasing transmission of the present invention.

Referring specifically to FIGS. 2 and 3, the mechanical power or phasing transmission of the present invention comprises a housing 10 having a pair of axially aligned rotatable shaft members 11, 12 extending therethrough. The shaft members 11, 12 are mounted in suitable bearing members 13 contained in race members 14. An oil seal 16 completes the mounting of the shaft members 11, 12 in the housing 10. The ends of the shaft members 11, 12 which are positioned proximate to each other are flared and specifically contructed to carry further components of the present invention. The housing 10 forms a cavity 15 through which the flared ends of the shaft members 11, 12 can freely maintain rotational movement.

A pancake motor 20 is fixed to the flared end of one of the shaft members 11. The preferred embodiment of the pancake motor 20 is an electrically powered motor. However, it is envisioned that some applications of the present invention will call for a hydraulic or pneumatic powered motor. In the embodiment shown for the purposes of this description, the pancake motor 20 includes a motor housing 21 which is in axial alignment with the shaft member 11. The shaft member 11 includes a center recess 17 in which a shaft bearing member 18 is retained in a race 19. A central motor shaft 22 is engaged in the shaft bearing member 18 and extends through the motor housing 21 so that the motor housing 21 remains in a fixed position as the motor shaft 22 rotates. A disk armature 23 is fixed to the motor shaft 22 for rotation therewith and a flux return plate 24 closes over the disk armature 23 to enclose the disk armature 23 for free rotation within the housing 10. The end of the motor shaft 22 which passes through the flux return plate 24 is mounted in a small bearing and race member 25 for smooth rotation. The flux return plate 24 and motor housing 21 are fixed to the flared end of the first shaft member 11 by any suitable means such as bolts 26. The pancake motor 20 further includes at least two brush members 27 extending from positions of support on the housing 21 of the pancake motor 20 to points of communication with the rotating disk armature 23.

An electrical contact ring 28 is fixed about the outer periphery of the first shaft member 11 and is is continuous communication with housing brushes 29 which extend through the transmission housing 10 and which are receiving current from an outside power source. The current received by the contact ring 28 from the housing brushes 29 is then fed through the motor housing 21 to the brush members 27 and thereby, to the armatures 23.

Since the pancake motor 20 is firmly fixed to the first shaft member 11, the pancake motor 20 is adapted to rotate with the first shaft member 11 at speeds that can approach 1800 rpm. The application of current to the brush members 27 will result in the disk armature 23 rotating within the motor housing 21 even during the high speed rotational movement of the first shaft member 11.

Continuing to refer to FIGS. 2 and 3, the flared end of the second shaft member 12 is adapted to receive a harmonic drive member 30. The harmonic drive member 30 consists of a dynamic spline 32 and circular spline 33, both of which have interior gearing teeth 34. The dynamic spline 32 is fixed to the flared end of the second shaft member 12 by bolts 31 and the circular spline 33 is fixed to the flux return plate 24 of the pancake motor 20, also by bolts 31. Located in loose contact with the circular spline 33 and dynamic spline 32 is a flex spline member 35 having exterior gearing teeth 36 designed to engage with their respective interior gearing teeth 34. The flex spline member 35 when pressed into an elliptical shape, thus engages the interior gear teeth 34 of the dynamic spline 32 and the circular spline 33. An elliptical shaped wave generator 37 is positioned inside the flex spline 35 will press the flex spline 35 into this desired elliptical shape as shown in FIGS. 5 and 6. A thrust bearing 47 is positioned along the axial centerline in the second shaft member 12 to engage the dynamic spline 32. The thrust bearing 47 serves to prevent any unwanted axial movement of the dynamic spline 32 with respect to the circular spline 33 during the operation of the wave generator 37.

Figure 4:
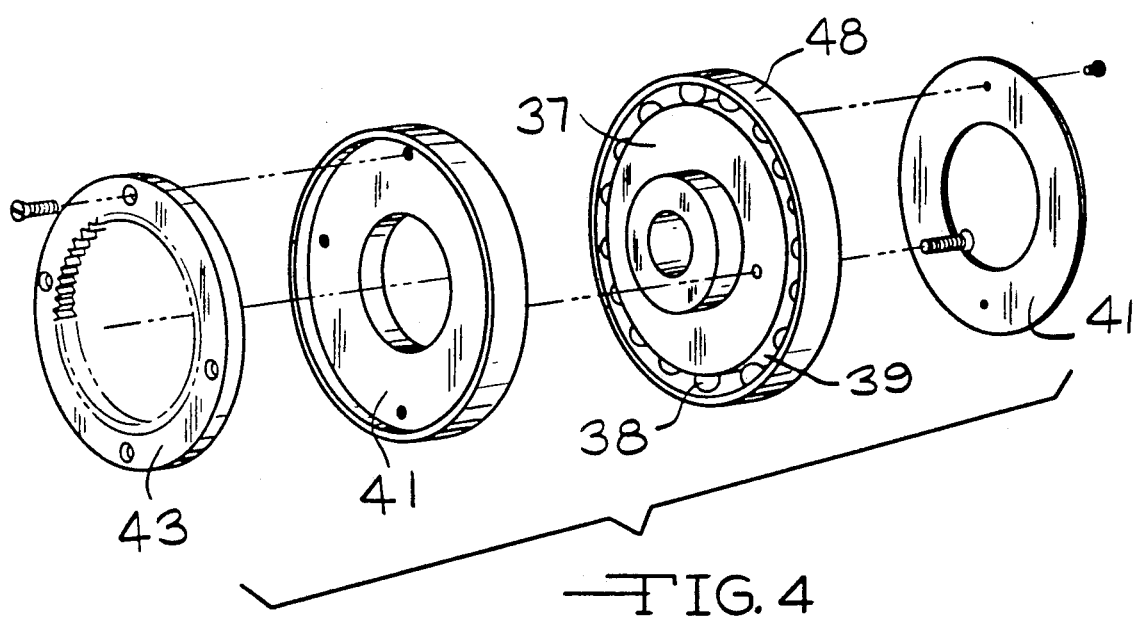
FIG. 4 is a blow-up view of the elliptical wave generator used in the phasing transmission of the present invention.

Referring now to FIG. 4, the elliptical wave generator 37 comprises an elliptically shaped body 40 having a race 39 about its peripheral edge. A plurality of bearings 38 are positioned in the race 39. A bearing retention ring 48 extends around the bearings 38, holding them in position in the race 39. The bearing retention ring 48 is flexible, thus allowing the elliptically shaped body 40 to rotate within the bearings 38 while the retention ring 48 is held stationary. Plate members 41 are fixed to the sides of the body 40 and assist in retaining the bearings 38 in the race 39.

Referring now to FIG. 3, the flex spline 35 is engaged around the retention ring 48. The engagement is most commonly accomplished through a friction fit. Thus, as the body 40 roates within the retention ring 48 it imparts a moving rotational elliptical shape to the retention ring 48 and the flex spine 35. This moving elliptical shape will impart a moving elliptical connection between the gear teeth 36 of the flex spline 35 and the gear teeth 34 of the dynamic spline 32 and the circular spline 33. Therefore, for every revolution of the elliptical shape wave generator 37, the phases of the dynamic spline 32 and the circular spline 33 will vary by the differential in the number of teeth, commonly two, between the circular spline 33 and the dynamic spline 32.

The flex spline 35 will always remain firmly enmeshed with the circular spline 33 and dynamic spline 32 along the major axis of the ellipse, thereby creating a "solid" juncture of intermeshed gear teeth. Since the circular spline 33 is fixed to the pancake motor 20 and the pancake motor 20 is fixed to the shaft member 11, the circular spline 33 and pancake motor will rotate integrally with the shaft member 11. Likewise, since the dynamic spline 32 is fixed to the second shaft member 12, it will rotate integrally with the second shaft member 12. Thus, during normal operation, the only interconnection between the first shaft member 11 and the second shaft member 12 is the "solid" juncture of intermeshed gear teeth between the flex spline 35 and the dynamic spline 32 and circular spline 33, which interconnection forces the two shaft members 11, 12 to rotate at identical speeds, as one.

Referring again to FIGS. 3 and 4, motion to the elliptical wave generator 37 is imparted through the interconnection between the motor shaft 22 of the pancake motor 20 and a series of planetary gears 42 engaged with a ring gear 43 which in turn is fixed to the body 40 of the elliptical wave generator 37. In an alternative embodiment, the planetary gears 42 and ring gear 43 are not included and the motor shaft 22 of the pancake motor 20 is engaged directly with the body 40 of the elliptical wave generator 37. However, in the preferred embodiment, the use of the planetary gears 42 and ring gear 43 to transfer input from the motor shaft 22 to the wave generator 37 helps facilitate the desired reduction of backlash. The planetary gear 42, ring gear 42 embodiment of the present invention will function to reduce the backlash potential to approximately 4 minutes.

Figure 7:
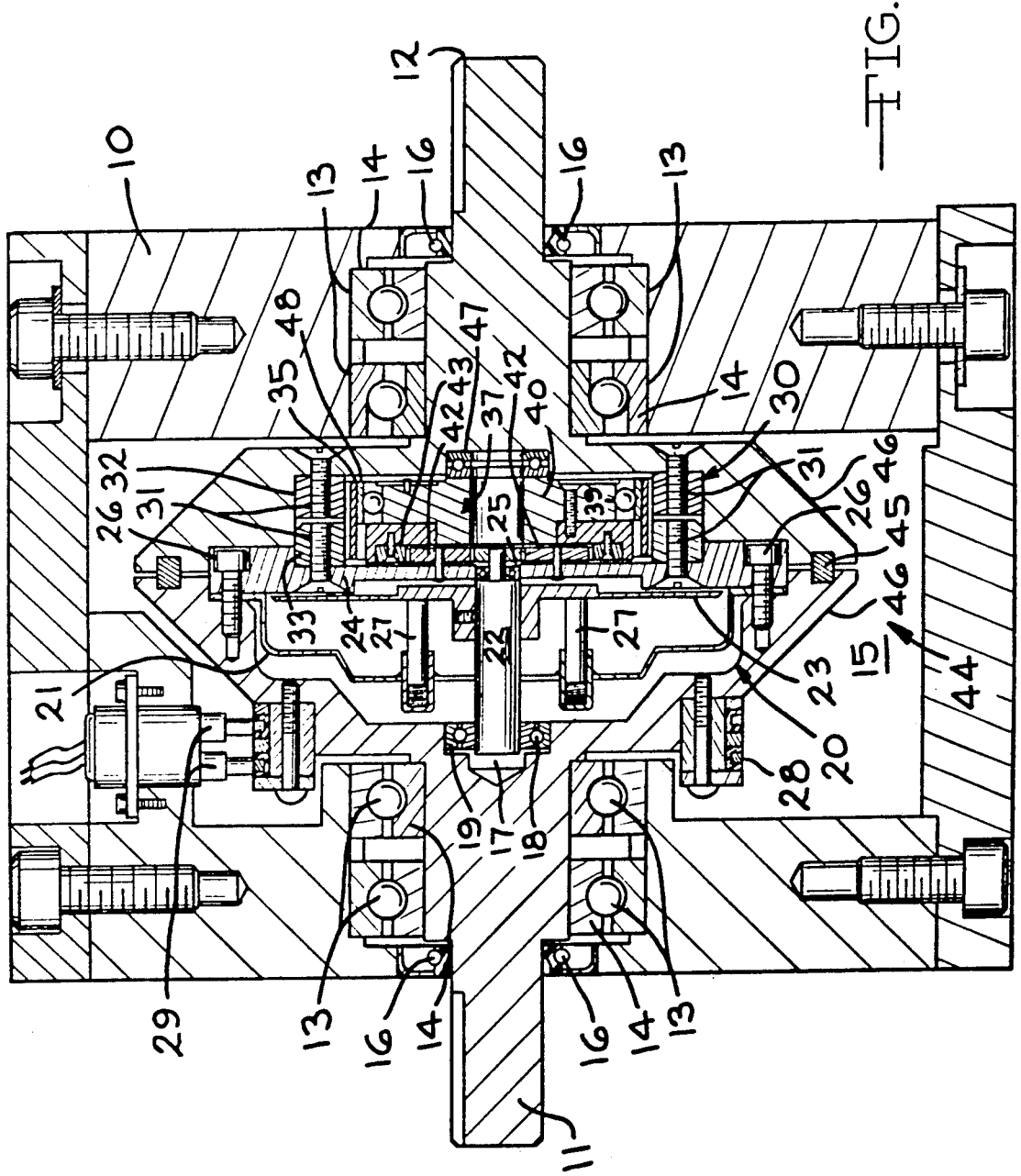
FIG. 7 shows a sectional view of an alternative embodiment of the phasing transmission incorporating the use of a friction clutch about the exterior of the coupling between the input shaft and the output shaft.

A further embodiment of the present invention, shown in FIG. 7, incorporates the use of a friction drive clutch 44 to assist in further reducing the backlash potential. When incorporated into the invention utilizing the planetary gear 42, ring 43 drive unit, the friction clutch 44 will produce a backlash potential near zero. The drive clutch 44 includes a friction plate 45 which is located between two clutch members 46 which are integrally attached to or formed with the outer perimeter of flared ends of the the first shaft 11 and second shaft 12. The friction plate 45, when squeezed between the two clutch plates 46, will assist in preventing any relative rotation between the first and second shaft members 11, 12 unless the pancake motor 20 is activated to power the elliptical wave generator 37 thereby creating a torque level which overcomes the torque rating for the clutch member 44. In such an instance, when the torque rating for the clutch member 44 is overcome, the first shaft member 11 and second shaft member 12 will incur a change of phase as the wave generator 37 is rotated.

The above description of the preferred embodiment of the present invention intended to be illustrative in nature and is not intended to be limiting upon the scope and content of the following claims.

We claim:

1. A mechanical power transmission comprising a pair of axially aligned rotatable shaft members, said shaft members being enclosed within a central housing with one end of each of said shaft member extending therefrom, said shaft members adapted to act as an input shaft and an output shaft interposed for power transmission between an external driving means and an external driven means; a motor member, having a motor housing of thin axial width located within said central housing, fixed to one of said shaft members and axially aligned to rotate wherewith, said motor member including a center shaft extending therefrom; and a harmonic drive member of thin axial width positioned within said central housing in axial alignment between said motor member and said remaining shaft member, said harmonic drive member including a dynamic spline fixed to said remaining shaft for rotation therewith, a circular spline fixed to said motor housing for rotation therewith, a flex spline engaged with said dynamic spline and said circular spline, and a wave generator in communication with said flex spline and engaged with said center shaft of said motor member, wherein activation of said motor causes said center shaft to rotate said wave generator within said harmonic drive member, thereby adjusting the phase of rotation between said input shaft and said output shaft.

2. A mechanical power transmission comprising a pair of axially aligned rotatable shaft members adapted to act as an input shaft and an output shaft interposed for power transmission between an external driving means and an external driven means; a motor member having a housing fixed to one of said shaft members and axially aligned to rotate therewith, said motor member including a center shaft extending therefrom and engaged with a planetary drive member; and a harmonic drive member positioned in axial alignment between said motor member and said remaining shaft member, said harmonic drive member including a dynamic spline fixed to said remaining shaft for rotation therewith, a circular spline fixed to said housing of said motor member for rotation therewith, a flex spine engaged with said dynamic spline and said circular spline, and a wave generator in communication with said flex spline, said wave generator having a ring gear in communication with said planetary drive member of said center shaft of said motor member, wherein activation of said motor causes said center shaft to rotate said planetary drive member and said ring gear thereby rotating said wave generator within said harmonic drive member, thereby adjusting the phase of rotation between said input shaft and said output shaft.

3. The power transmission of claim 2 further including a friction member interposed between said two rotatable shaft members, said friction member providing a desired rotatable driving torque between said two shaft members to prevent relative movement between said shaft members during operation of said power transmission, wherein said motor member overcomes such driving torque when rotating said wave generator to adjust the phase of rotation between said input shaft and said output shaft.

* * * * *